United States Patent
Netsu

Patent Number: 5,715,074
Date of Patent: Feb. 3, 1998

[54] DUPLEX SWITCHING APPARATUS

[76] Inventor: Yutaka Netsu, c/o NEC Corporation, 7-1, Shiba 5-chome, Minato-ku, Tokyo, Japan

[21] Appl. No.: 631,238

[22] Filed: Apr. 12, 1996

[30] Foreign Application Priority Data

Apr. 14, 1995 [JP] Japan ................... 7-089204

[51] Int. Cl.$^6$ ............... H04B 10/14; H04J 14/08
[52] U.S. Cl. ............... 359/110; 359/136; 359/137; 359/140; 359/161; 370/252
[58] Field of Search ............... 359/110, 113, 359/121, 136, 137, 140, 167, 161; 370/228, 245, 252, 516; 375/37.1

[56] References Cited

U.S. PATENT DOCUMENTS

| | | | |
|---|---|---|---|
| 5,212,534 | 5/1993 | Bianchi et al. | 359/110 |
| 5,299,044 | 3/1994 | Mosch et al. | 359/110 |
| 5,327,277 | 7/1994 | Van Der Plas | 359/140 |
| 5,357,360 | 10/1994 | Imhoff et al. | 359/110 |
| 5,537,241 | 7/1996 | Fisher | 359/110 |
| 5,550,807 | 8/1996 | Kuroshita | 370/252 |

*Primary Examiner*—Leslie Pascal
*Attorney, Agent, or Firm*—Scully, Scott Murphy & Presser

[57] ABSTRACT

A duplex switching apparatus for an optical burst signal multiplex transmission system includes a spare and current system optical subscriber line terminating sections. The spare system optical subscriber line terminating section includes a distance measuring section for measuring relative distance values from subscriber units to the spare and current system optical subscriber line terminating sections, a first calculation circuit for calculating spare system distance values to the subscriber units, a second calculation circuit for calculating spare system reception/transmission phase information, and a notification section for notifying the current system optical subscriber line terminating section of the spare system reception/transmission phase information. The current system optical subscriber line terminating section includes an output section for outputting a distance measurement signal, and a notification section for notifying the subscriber units of spare system reception/transmission phase information. The current and spare system optical subscriber line terminating sections performs switching of reception/transmission phases of the subscriber unit and switching of the current and spare system optical subscriber line terminating sections at the same timing.

4 Claims, 6 Drawing Sheets

FIG. 1

FIG. 3A MFP

FIG. 3E NTx

FIG. 3F REMOTEST SUBSCRIBER UNIT NTx

DUPLEX SWITCHING APPARATUS

BACKGROUND OF THE INVENTION

The present invention relates to an optical burst signal multiplex transmission system in which current and spare system subscriber line terminating sections in an office terminating apparatus are connected to a plurality of subscriber units via optical subscriber lines and a star coupler for a branching operation so as to perform bidirectional transmission to the subscriber units and, more particularly, to a duplex switching apparatus for performing forcible duplex switching between the current and spare system optical subscriber line terminating sections.

Figure 5:
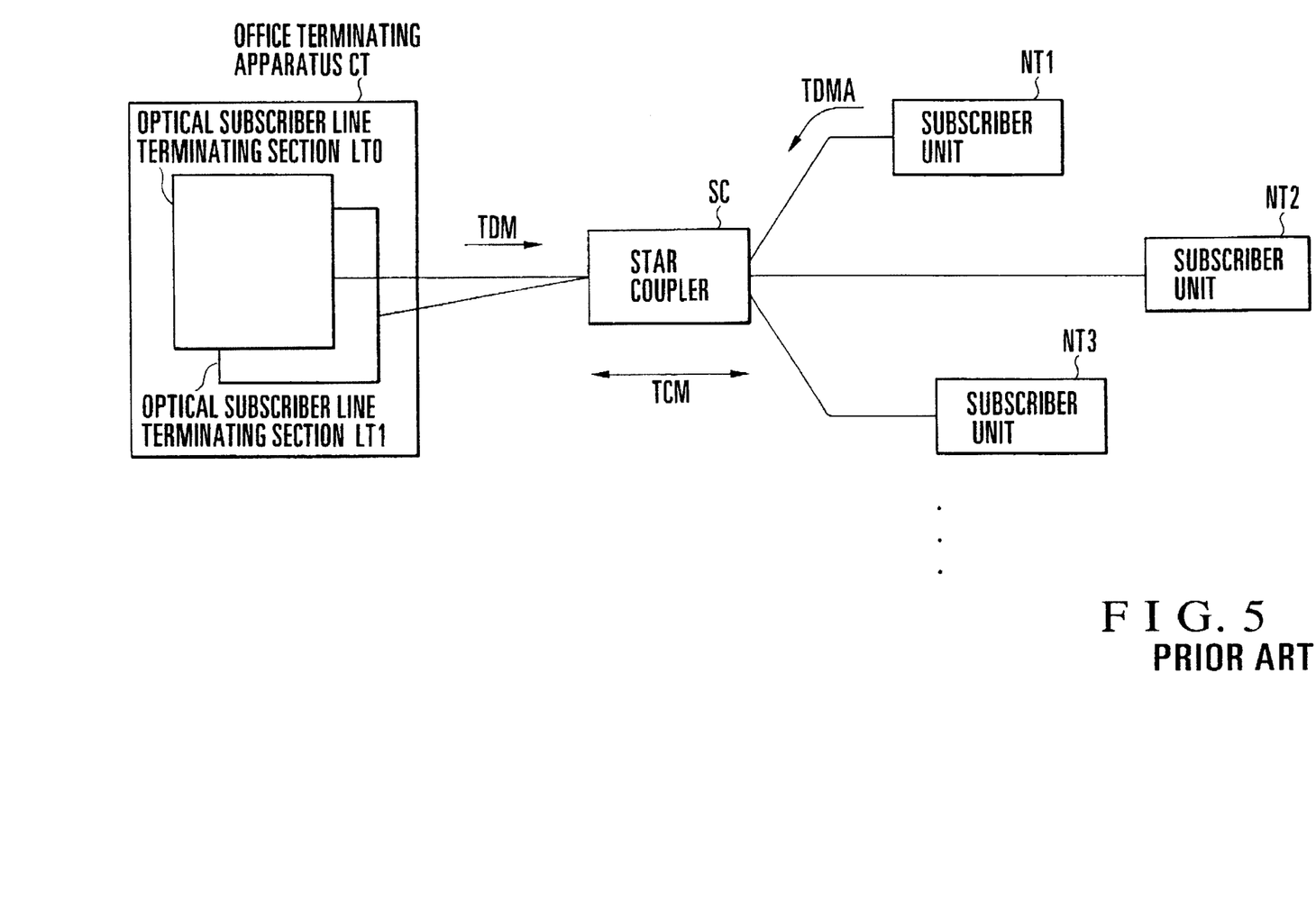
FIG. 5 is a block diagram showing the schematic arrangement of a conventional system.

FIG. 5 shows an optical burst signal multiplex transmission system in which an office terminating apparatus accommodates a plurality of subscriber units via internal optical subscriber line terminating sections, optical subscriber lines, and a star coupler for a branching operation. Referring to FIG. 5, reference symbol CT denotes an office terminating apparatus, LT0 and LT1, optical subscriber line terminating sections, SC, a star coupler, and NT1 to NT3, subscriber units.

In this transmission system, TDM (Time Division Multiplexing) is used to transmit a download signal from the office terminating apparatus CT to the subscriber units NT1 to NT3, TDMA (Time Division Multiple Access) is used to transmit upload signals from the subscriber units NT1 to NT3 to the office terminating apparatus CT, and TCM (Time Compression Multiplexing) is used to perform bidirectional transmission of an optical burst signal through a single-core subscriber line.

Figure 6:
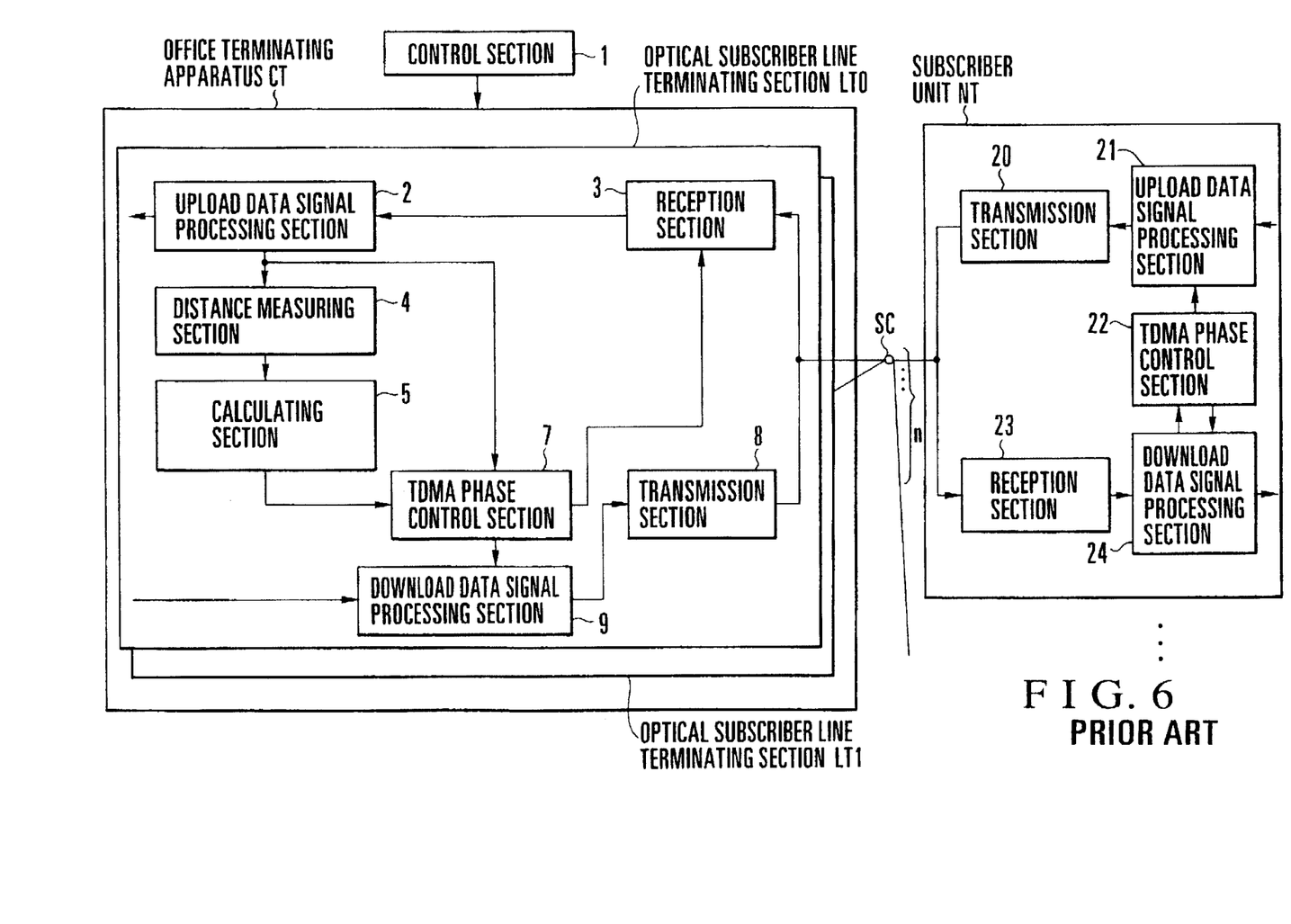
FIG. 6 is a block diagram showing the detailed arrangement of the conventional system.

FIG. 6 shows the arrangement of the main part of this optical burst signal multiplex transmission system. Referring to FIG. 6, each of the optical subscriber line terminating sections LT0 and LT1 in the office terminating apparatus CT comprises an upload data signal processing section 2 for processing upload data signals from a plurality of subscriber units NT, a distance measuring section 4 for measuring the distances from the subscriber units NT, a calculating section 5 for performing arithmetic operations for the measured distances, a TDMA phase control section 7 for controlling the phases of upload and download data signals, a transmission section 8 for transmitting download data to the subscriber units NT, and a download data signal processing section 9 for processing a download signal to be transmitted to the subscriber units NT.

Each subscriber unit NT comprises a transmission section 20 for transmitting an upload data signal to the office terminating apparatus CT, an upload data signal processing section 21 for processing an upload data signal, a TDMA phase control section 22 for controlling the phases of upload and download data signals, a reception section 23 for receiving a download data signal from the office terminating apparatus CT, and a download data signal processing section 24 for processing a download data signal.

The optical subscriber line lengths from the star coupler SC to the respective subscriber units NT are different from each other. For this reason, the office terminating apparatus CT performs transmission phase control of the respective subscriber units NT through the TDMA phase control sections 7 in the optical subscriber line terminating sections LT1 and LT0 to prevent collision between upload burst signals from the subscriber units NT.

Assume that a system switching operation is performed in the office terminating apparatus CT having a redundant arrangement including the optical subscriber line terminating section LT0 as a current system and the optical subscriber line terminating section LT1 as a spare system. In this case, since the distance from the current system optical subscriber line terminating section LT0 to the star coupler SC is different from the distance from the spare system optical subscriber line terminating section LT1 to the star coupler SC, download signals or download and upload signals collide. For this reason, in the conventional system, the transmission section 8 of the spare system optical subscriber line terminating section LT1 is set in a called/standby state.

In this state, duplex switching between the optical subscriber line terminating sections LT0 and LT1 is forcibly performed in the following manner. First of all, all the connected lines are disabled, and the transmission section 8 of the current system optical subscriber line terminating section LT0 is set in a called/standby state. The distance measuring section 4 of the optical subscriber line terminating section LT1 then measures the distance from the spare system optical subscriber line terminating section LT1 to each subscriber unit NT. Thereafter, line connection is performed.

As described above, in the conventional optical burst signal multiplex transmission system, when forcible duplex switching between the optical subscriber line terminating sections LT0 and LT1 constituting the redundant arrangement is to be performed, since the distances between the current and spare optical subscriber line terminating sections LT0 and LT1 and each subscriber unit NT are different from each other, distance measurement must be performed in the spare system optical subscriber line terminating section LT1. In this case, however, since the transmission section 8 of the spare system optical subscriber line terminating section LT1 is in the called/standby state, line connection is performed after all the lines connected to the current system optical subscriber line terminating section LT0 are disabled, and the distances to the respective subscriber units NT are measured. Line switching cannot therefore be performed without a short break.

SUMMARY OF THE INVENTION

It is an object of the present invention to provide a duplex switching apparatus which performs forcible duplex switching between optical subscriber line terminating sections constituting a redundant arrangement without a short break.

In order to achieve the above object, according to the present invention, there is provided a duplex switching apparatus for an optical burst signal multiplex transmission system which has a passive double star arrangement in which current and spare system optical subscriber line terminating sections arranged in an office terminating apparatus accommodate a plurality of subscriber units through optical subscriber lines and a star coupler for performing a branching operation, and performs bidirectional transmission by a TCM scheme through a single-core subscriber line using a TDM scheme for download signals from the optical subscriber line terminating sections to the subscriber units, and a TDMA scheme for upload burst signals from the subscriber units to the optical subscriber line terminating sections, the spare system optical subscriber line terminating section including first measurement means for receiving a distance measurement signal transmitted from the current system optical subscriber line terminating section to the subscriber unit, and measuring relative distance values from the subscriber unit to the spare and current system optical subscriber line terminating sections, first calculation means for calculating a spare system distance value to the subscriber unit on the basis of a current system distance value from the current system optical subscriber line terminating section to the subscriber unit and the relative distance value measured by the first measurement means, second calculation means for calculating spare system reception/transmission phase information of the subscriber unit on the basis of current system reception/transmission phase information with which the current system optical subscriber line terminating section performs reception/transmission phase control of the subscriber unit, and the spare system distance value calculated by the first calculation means, and notification means for notifying the current system optical subscriber line terminating section of the spare system reception/transmission phase information calculated by the second calculation means, and the current system optical subscriber line terminating section including transmission means for selecting a subscriber unit and individually sending a distance measurement signal thereto upon switching from the current system optical subscriber line terminating section to the spare system optical subscriber line terminating section, and notification means for notifying the subscriber unit of the spare system reception/transmission phase information notified from the spare system optical subscriber line terminating section in a predetermined reference period, wherein after the spare system reception/transmission phase information is notified to all subscriber units in operation, the current and spare system optical subscriber line terminating sections perform switching of reception/transmission phases of the subscriber unit and switching of the current and spare system optical subscriber line terminating sections at the same timing within the reference period.

DESCRIPTION OF THE PREFERRED EMBODIMENT

The present invention will be described below with reference to the accompanying drawings.

Figure 1:
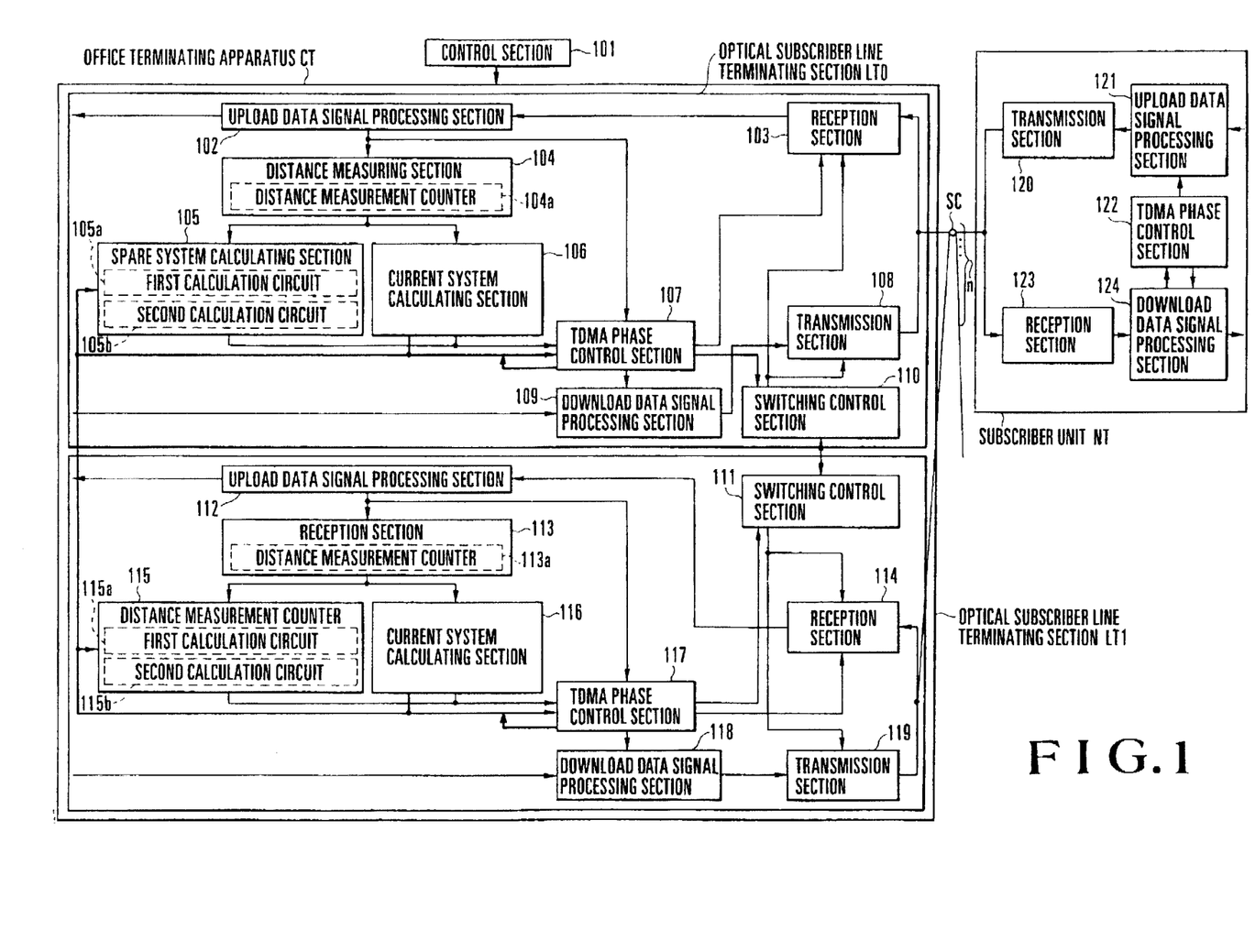
FIG. 1 is a block diagram showing a duplex switching apparatus according to an embodiment of the present invention.

FIG. 1 shows an optical burst signal multiplex transmission system according to an embodiment of the present invention and, more specifically, the main parts of an office terminating apparatus and a subscriber unit. Referring to FIG. 1, an office terminating apparatus CT performs bidirectional transmission of optical burst signals to a plurality of subscriber units NT via a star coupler SC. In this transmission system, TDM is used to transmit a download signal from the office terminating apparatus CT to each subscriber unit NT, TDMA is used to transmit an upload signal from each subscriber unit NT to the office terminating apparatus CT, and TCM is used to perform bidirectional transmission of an optical burst signal through a signal-core optical subscriber line.

Optical subscriber line terminating sections LT0 and LT1 in the office terminating apparatus CT respectively comprise upload data signal processing sections 102 and 112 for processing upload data signals from the subscriber unit NT, reception sections 103 and 114 for receiving upload data signals from the subscriber units NT, distance measuring sections 104 and 113 for measuring the distances from the subscriber units NT by using distance measurement counters 104a and 113a, spare system calculating sections 105 and 115 including first calculation circuits 105a and 115a for calculating the home line true distances in the spare system mode, and second calculation circuits 105b and 115b for calculating spare system reception/transmission phase information on the basis of the calculated true distances and current system reception/transmission phase information, current system calculating sections 106 and 116 for calculating current system distance measurement values of all the subscriber units NT in operation in the current system mode, TDMA phase control sections 107 and 117 for controlling the phases of upload and download data signals, transmission sections 108 and 119 for transmitting download data to the subscriber units NT, download data signal processing sections 109 and 118 for processing download data signals to be transmitted to the subscriber units NT, and switching control sections 110 and 111 for performing system switching at the same timing. Reference numeral 101 denotes a control section for controlling the office terminating apparatus CT.

Each subscriber unit NT comprises a transmission section 120 for transmitting an upload data signal to the office terminating apparatus CT, an upload data signal processing section 121 for processing an upload data signal, a TDMA phase control section 122 for controlling the phases of upload and download data signals, a reception section 123 for receiving a download data signal from the office terminating apparatus CT, and a download data signal processing section 124 for processing a download data signal.

Since the optical subscriber line lengths from the star coupler SC to the respective subscriber units NT are different from each other, the office terminating apparatus CT performs transmission phase control of the respective subscriber units NT through the TDMA phase control sections 107 and 117 arranged in the optical subscriber line terminating sections LT1 and LT0 to prevent collision between upload burst signals from the subscriber units NT.

Figure 2A:
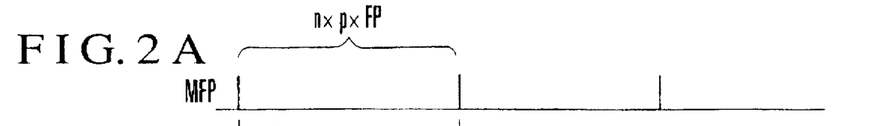
FIG. 2A is a timing chart showing a multiframe pulse MFP in the system in FIG. 1.
Figure 2B:
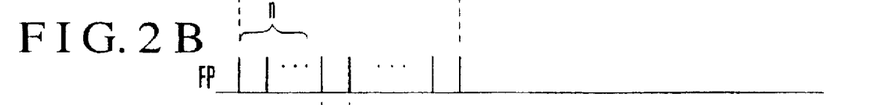
FIG. 2B is a timing chart showing a frame pulse FP constituting the multiframe pulse in FIG. 2A.
Figure 2C:
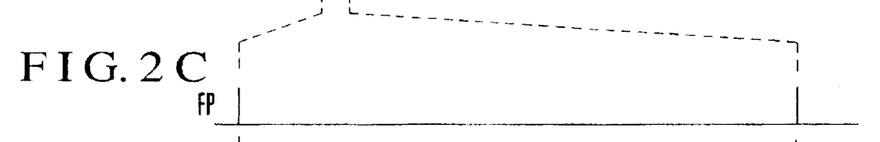
FIG. 2C is an enlarged view of one frame of the frame pulse in FIG. 2B.

The operation of the main part of the present invention will be described in detail next with reference to FIGS. 1, 2A to 2F, 3A to 3F, and 4A to 4F. FIGS. 3A to 3F explain a transmission phase in the remotest subscriber terminal. FIGS. 4A to 4F explain a transmission phase in a subscriber terminal before and after a system switching operation. Since FIGS. 3A to 3C and 4A to 4F are identical to FIGS. 2A to 2C, a description thereof will be omitted.

Assume that the optical subscriber line terminating sections LT0 and LT1 are the current and spare system sections, respectively, and the number of subscriber units NT which can be connected to the optical subscriber line terminating sections LT0 and LT1 is n. A frame pulse FP (FIGS. 2B and 2C) as the reference for one frame and a multiframe pulse MFP (FIG. 2A) with a timing of n (the number of subscriber units)×p (integer)×FP (frame pulse) are respectively set as the reference timings of the optical subscriber line terminating sections LT0 and LT1.

When the control section 101 issues a forcible switching instruction to designate a subscriber unit $NT_x$ as a distance measurement target, the TDMA phase control section 107 of the current system optical subscriber line terminating section LT0 sends a distance measurement signal to the download data signal processing section 109. In this case, the distance measuring section 113 of the spare system optical subscriber line terminating section LT1 starts the internal distance measurement counter 113a to start distance measurement at the download signal transmission completion timing (timing t1 in FIG. 2E) of the frame pulse FP which corresponds to the polling period of the subscriber unit $NT_x$.

This distance measurement signal is multiplexed with the download signal frame by the download data signal processing section 109. The download signal is then multiplexed with a download OAM (Operation And Maintenance) signal, and the resultant signal is transmitted from the transmission section 108 to the subscriber unit $NT_x$. In the subscriber unit $NT_x$, the download data signal processing section 124 extracts the download OAM signal from the download signal received by the reception section 123. Upon detection of the distance measurement signal separated from the download OAM signal, the TDMA phase control signal 122 outputs the distance measurement signal to the upload data signal processing section 121 without any change. The upload data signal processing section 121 multiplexes the distance measurement signal with an upload OAM signal, and the transmission section 120 transmits the resultant signal at a download signal range end point (timing t2 in FIG. 2F) during a distance measurement guard time.

Figure 2D:
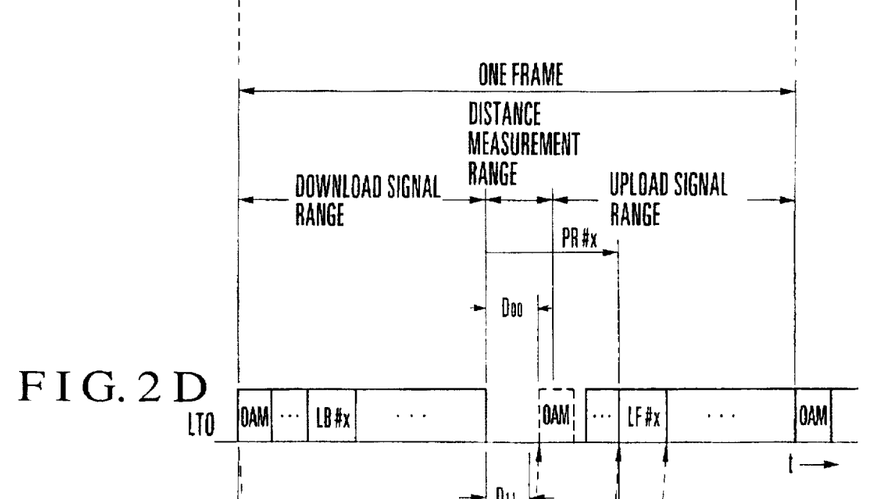
FIG. 2D is a view showing transmission and reception phases in a current system optical subscriber terminating section.
Figures 2E, 2F:
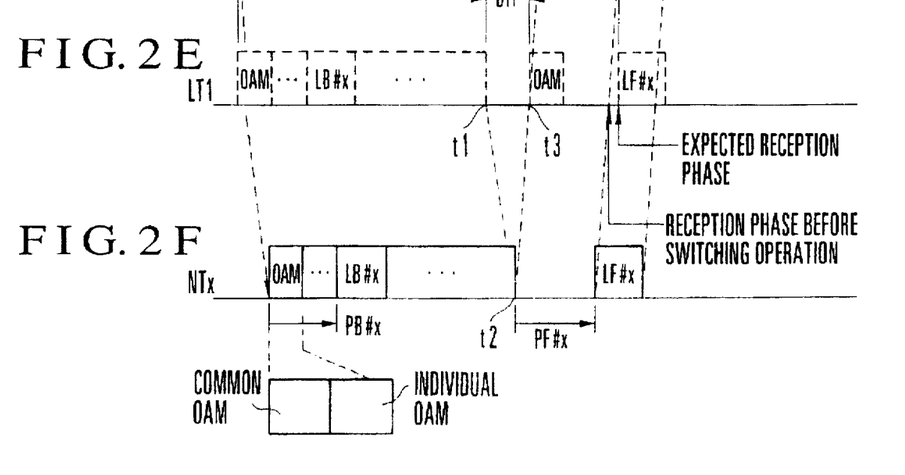
FIG. 2E is a view showing transmission and reception phases in a spare system optical subscriber terminating section.
FIG. 2F is a view showing transmission and reception phases in a subscriber terminal.

In the spare system optical subscriber line terminating section LT1, when the reception section 114 receives this upload OAM signal (timing t3 in FIG. 2E), the upload data signal processing section 112 detects the distance measurement signal from the OAM signal. In response to the detection output from the upload data signal processing section 112, the distance measuring section 113 stops the distance measurement counter 113a. As shown in FIGS. 2D and 2E, this embodiment is based on the assumption that the distance between the spare system optical subscriber line terminating section LT1 and the subscriber unit NT is shorter than the distance between the current system optical subscriber line terminating section LT0 and the subscriber unit NT.

The distance measuring section 113 of the spare system optical subscriber line terminating section LT1 immediately notifies the spare system calculating section 115 of the distance measurement value (round trip time) obtained by the distance measurement counter 113a. Upon reception of the distance measurement value from the distance measuring section 113, the spare system calculating section 115 acquires current system distance measurement values (distance measurement values based on the distances from the current system optical subscriber line terminating section LT0 to the subscriber terminal apparatuses N) associated with all the subscriber units NT in operation from the current system calculating section 106 of the current system optical subscriber line terminating section LT0, and the reception/transmission phase information of all the subscriber units NT in operation from the TDMA phase control section 107, thereby performing calculations according to equations (1) to (6) using the first and second calculation circuit 115a and 115b.

As shown in FIGS. 2D and 2E, let $D_{00x}$ be the current system distance measurement value based on the distance from the current system optical subscriber line terminating section LT0 to the subscriber unit $NT_x$, $D_{11x}$ be the spare system distance measurement value based on the distance from the spare system optical subscriber line terminating section LT1 to the subscriber unit $NT_x$, and $D_{01x}$ be the relative distance measurement value (½ measurement value) based on the following route: current system optical subscriber line terminating section LT0→subscriber unit $NT_x$→spare system optical subscriber line terminating section LT1. In this case, the spare system distance measurement value $D_{11x}$ is given by $$D_{11x}=2D_{01x}-D_{00x} \quad (D_{00x}, D_{11x} \leq \text{remotest apparatus distance value})$$

A distance difference $\Delta d$ between the current system distance measurement value $D_{00x}$ and the spare system distance measurement value $D_{11x}$ is given by $$\Delta d = D_{11x} - D_{00x} \qquad (2)$$

Therefore, the true distance from the spare system optical subscriber line terminating section LT1 to another subscriber unit $NT_n$ is given by $$D_{11n} = D_{00n} + \Delta d \qquad (3)$$

Phase information as individual data of each subscriber unit NT consists of download data reception phase PB and upload data transmission phase PF. The optical subscriber line terminating sections LT0 and LT1 have reception phase PR of an upload burst signal from each subscriber unit NT. In this case, a download data reception phase PB#x in FIG. 2F in the subscriber unit $NT_x$ is given by $$PB\#x=(\text{download OAM length})+\sum_{n=1}^{x-1} LB\#n$$

where LB#n is the download main information length in the subscriber unit $NT_x$, as shown in FIGS. 2D to 2F.

Figure 3A:
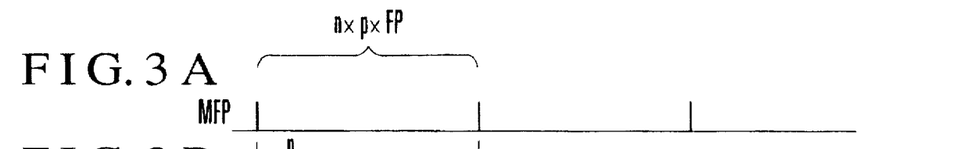
FIG. 3A is a timing chart showing a multiframe pulse MFP in the system in FIG. 1.
Figures 3B, 3C:
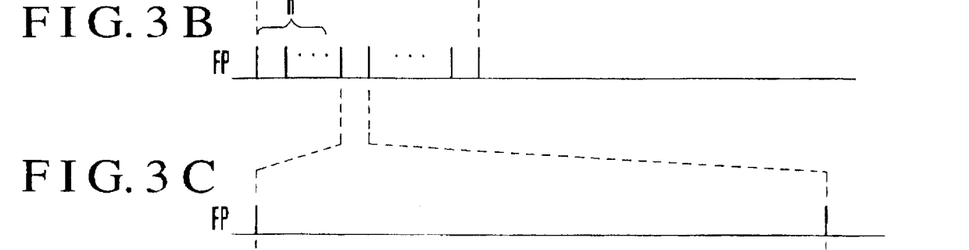
FIG. 3B is a timing chart showing a frame pulse FP constituting the multiframe pulse in FIG. 3A.
FIG. 3C is an enlarged view of one frame of the frame pulse in FIG. 3B.
Figure 3D:
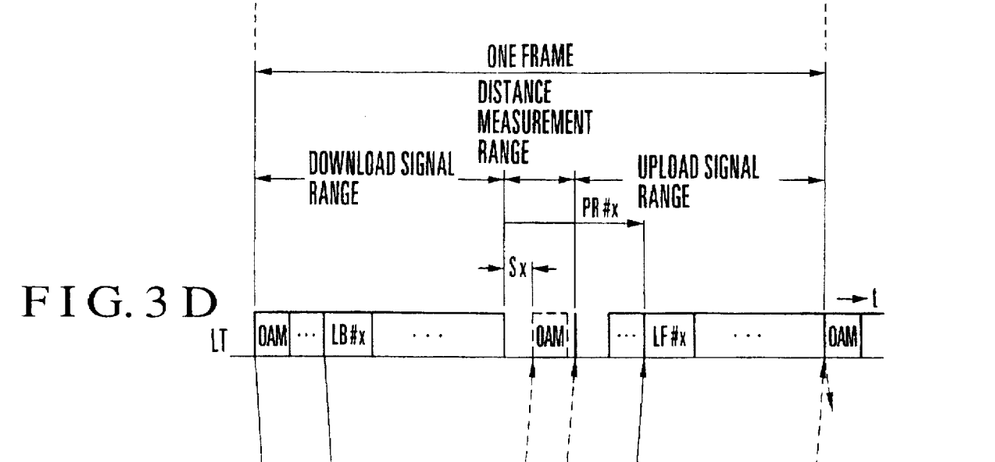
FIG. 3D is a view showing transmission and reception phases in an optical subscriber line terminating section.

Upload data transmission phase PF#x in FIG. 2F in the subscriber unit $NT_x$ is given by $$PF\#x=(S_{max}-Sx)+(\text{upload OAM length}+\sum_{n=1}^{x-1} LF\#n$$

where LF#n is the upload main information length in the subscriber unit $NT_x$, Sx is the distance value between the optical subscriber line terminating section LT and the subscriber unit $NT_x$ in FIG. 3D, and $S_{max}$ is the remotest apparatus distance value from the optical subscriber line terminating section LT to the subscriber unit NT. As the values Sx and $S_{max}$, the true distance values obtained by the first calculation circuit 115a according to equation (3) are used, and the distance difference Δd between the current and spare system distance values contained in the values Sx and $S_{max}$ is canceled.

A data reception phase PR#x from the subscriber unit $NT_x$ in FIG. 2D in the optical subscriber line terminating section LT0 is given by $$PR\#x=S_{max}+(\text{upload OAM length})+\sum_{n=1}^{x-1} LF\#n$$

Figure 3E:
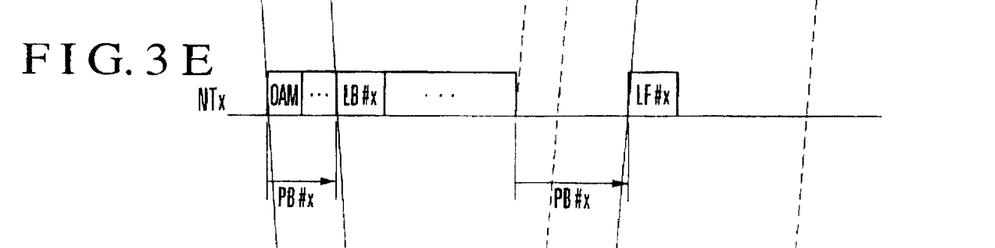
FIG. 3E is a view showing transmission and reception phases in a subscriber terminal $NT_x$.
Figure 3F:
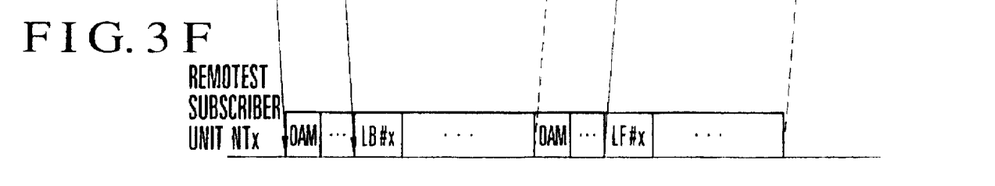
FIG. 3F is a view showing transmission and reception phases in a remotest subscriber terminal $NT_x$.

The data transmission phase PF#x in the subscriber unit $NT_x$, which is given by equation (5), is a transmission phase based on the virtual distance to the subscriber unit $NT_x$ in FIG. 3E as the remotest apparatus distance in consideration of the upload main information length in each subscriber unit NT. For this reason, collision between upload burst signals from the respective subscriber units NT can be prevented.

Assume that the subscriber unit NT receives a download signal. In this case, although the phase of the download signal itself changes, the reception phase PB used in the current system can be used without any change because data addressed to each subscriber unit NT is based on the start portion of the download signal. For this reason, the subscriber unit NT need not consider the distance difference between the current and spare optical subscriber line terminating sections. In practice, therefore, only the transmission phase of the spare system needs to be notified to each subscriber unit NT. Upload signals are received by the optical subscriber line terminating sections LT using the same phase in both the current and spare systems since a frame is constituted by the frame pulse FP. Note that the transmission phase PF in each subscriber unit depends on the distance difference because the same main information length is set to make the reception phases PR in both the current and spare system optical subscriber line terminating sections constant.

Figure 4A:
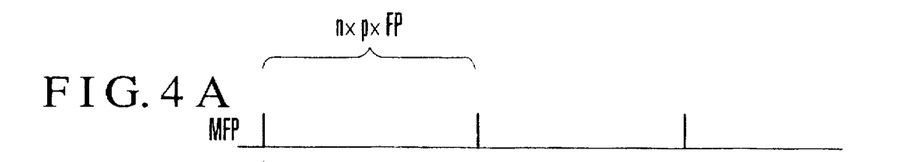
FIG. 4A is a timing chart showing a multiframe pulse MFP in the system in FIG. 1.
Figure 4B:
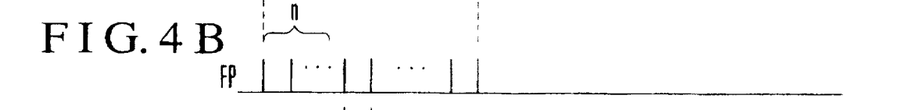
FIG. 4B is a timing chart showing a frame pulse FP constituting the multiframe pulse in FIG. 4A.
Figure 4C:
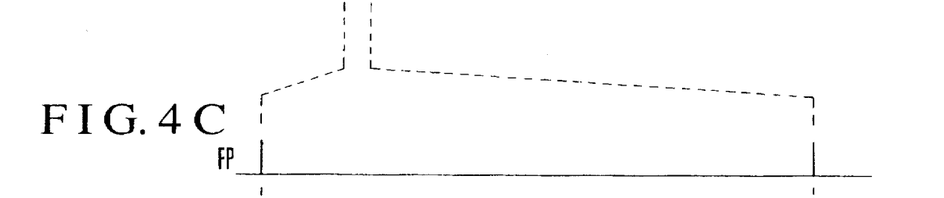
FIG. 4C is an enlarged view of one frame of the frame pulse in FIG. 4B.
Figure 4D:
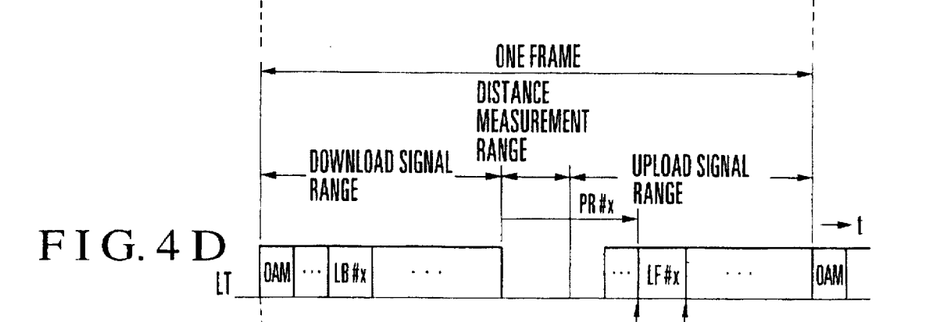
FIG. 4D is a view showing transmission and reception phases in an optical subscriber line terminating section.
Figures 4E, 4F:
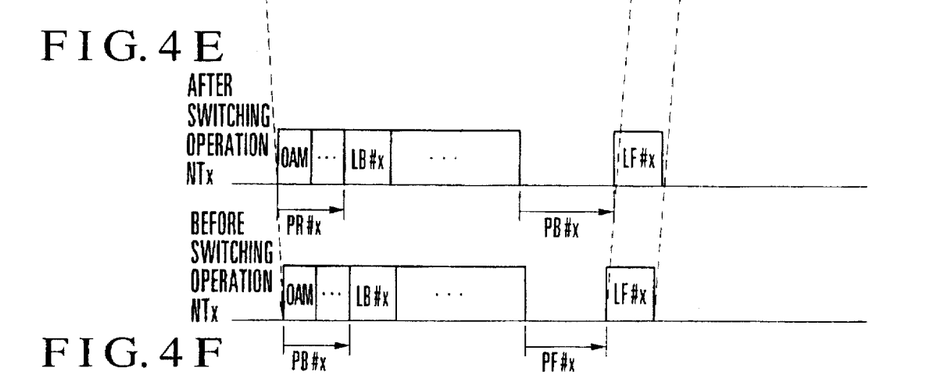
FIG. 4E is a view showing transmission and reception phases in the subscriber terminal $NT_x$ after a switching operation.
FIG. 4F is a view showing transmission and reception phases in the subscriber terminal $NT_x$ before the switching operation.

When the value −Δd is added to the current system transmission phase PF#x in FIG. 4F as the transmission phase before a switching operation, a transmission phase PF#x' in FIG. 4E is obtained after the switching operation. In this case, as the reception phase PR of upload data from each subscriber unit NT, which is used in the optical subscriber line terminating section LT, current system phase information can be used without any change, as shown in FIG. 4E, because the reception phase does not change in the optical subscriber line terminating section LT regardless of the above conditions.

Upon completing the calculations based on equations (1) to (6), the spare system calculating section 115 notifies the TDMA phase control sections 107 and 117 of each phase information of the spare system.

In this case, in the spare system optical subscriber line terminating section LT1, the TDMA phase control section 117 notifies the download data signal processing section 118 of the spare system transmission and reception phases PF and PB. These phases PF and PB are multiplexed with a download OAM signal, and the resultant signal is sent to the transmission section 119. The reception section 114 notifies the download data signal processing section 118 of the reception phase PR.

At this time, the transmission section 119 of the spare system optical subscriber line terminating section LT1 is in a called/standby state. Therefore, the TDMA phase control section 107 of the current system optical subscriber line terminating section LT0 notifies the download data signal processing section 109 of the spare system transmission and reception phases PF and PB. These phases PF and PB are multiplexed with a download OAM signal. The transmission section 108 transmits the resultant signal to each subscriber unit NT. Upon detecting phase information addressed to the home apparatus, each subscriber unit NT returns a reception/ transmission acquisition signal to the current system optical subscriber line terminating section LT0. In the current system optical subscriber line terminating section LT0, the TDMA phase control section 107 detects phase acquisition signals from all the subscriber units NT which are separated by the upload data signal processing section 102. The TDMA phase control section 107 notifies the switching control section 110 of a switching permission signal. The switching control section 110 notifies the switching control section ill of this switching designation signal.

After this operation, the switching control section 110 disables the transmission section 108 at the end of transmission of download data in the first frame (FP period) of the MFP period. Meanwhile, each subscriber unit NT switches phase position notified in advance through the individual OAM (FIG. 2F) in the download OAM signal of a download signal frame as new data reception and transmission phases at the reception timing of the common OAM of the download OAM signal.

In the spare system optical subscriber line terminating section LT1, the switching control section 111 performs a switching operation from the reception side of the first frame of the multiframe pulse MFP period, and enables the transmission section 119 from the next frame pulse FP. In this case, the spare system optical subscriber line terminating section LT1 executes the switching operation from the reception side to prevent collision between upload and download data at the switching timing.

With this procedure, forcible duplex switching of the optical subscriber line terminating sections LT0 and LT1 is performed.

As described above, according to the present invention, distance values and phase information are exchanged between the current and spare system optical subscriber line terminating sections LT0 and LT1, and the spare system optical subscriber line terminating section LT1 performs relative distance measurement with only a reception operation while being set in a transmission called/standby state. In addition, the optical subscriber line terminating section LT1 calculates the true distance value of the home line and phase information from this value and the distance value of the current system line. Meanwhile, the current system optical subscriber line terminating section LT0 notifies each subscriber unit NT of the spare system phase information, and performs switching of the reception and transmission phases of each subscriber unit NT and switching of the transmission and reception phases of the current and spare system optical subscriber line terminating sections LT0 and LT1 at the same timing.

The current system optical subscriber line terminating section LT0 does not therefore disable lines before a switching operation, but the switching operation is executed after the current system optical subscriber line terminating section LT1 is activated. For this reason, forcible duplex switching, which accompanies a line disabling operation as in the prior art, can be executed without a short break. As a result, the practicability of the system can be improved.

What is claimed is:

1. A duplex switching apparatus for an optical burst signal multiplex transmission system which has a passive double star arrangement in which current and spare system optical subscriber line terminating sections arranged in an office terminating apparatus accommodate a plurality of subscriber units through optical subscriber lines and a star coupler for performing a branching operation, and performs bidirectional transmission by a TCM scheme through a single-core subscriber line using a TDM scheme for download signals from said optical subscriber line terminating sections to said subscriber units, and a TDMA scheme for upload burst signals from said subscriber units to said optical subscriber line terminating sections, said spare system optical subscriber line terminating section including first measurement means for receiving a distance measurement signal transmitted from said current system optical subscriber line terminating section to said subscriber unit, and measuring relative distance values from said subscriber unit to said spare and current system optical subscriber line terminating sections, first calculation means for calculating a spare system distance value to said subscriber unit on the basis of a current system distance value from said current system optical subscriber line terminating section to said subscriber unit and the relative distance value measured by said first measurement means, second calculation means for calculating spare system reception/transmission phase information of said subscriber unit on the basis of current system reception/transmission phase information with which said current system optical subscriber line terminating section performs reception/transmission phase control of said subscriber unit, and the spare system distance value calculated by said first calculation means, and notification means for notifying said current system optical subscriber line terminating section of the spare system reception/transmission phase information calculated by said second calculation means, and said current system optical subscriber line terminating section including transmission means for selecting a subscriber unit and individually sending a distance measurement signal thereto upon switching from said current system optical subscriber line terminating section to said spare system optical subscriber line terminating section, and notification means for notifying said subscriber unit of the spare system reception/transmission phase information notified from said spare system optical subscriber line terminating section in a predetermined reference period, wherein after the spare system reception/transmission phase information is notified to all subscriber units in operation, said current and spare system optical subscriber line terminating sections perform switching of reception/transmission phases of said subscriber unit and switching of said current and spare system optical subscriber line terminating sections at the same timing within the reference period.

2. An apparatus according to claim 1, wherein said current and spare system optical subscriber line terminating sections exchange distance values and reception/transmission phase information when said first calculation means calculates a spare system distance value, said second calculation means calculates spare system reception/transmission phase information, and said notification means notifies the spare system reception/transmission phase information.

3. An apparatus according to claim 1, wherein said notification means notifies said subscriber unit of spare system reception/transmission phase information to change a transmission phase in said subscriber unit.

4. An apparatus according to claim 1, wherein said current system optical subscriber line terminating section comprises second measurement means for measuring a current system distance value from said current system optical subscriber line terminating section to said subscriber unit, and notifying said first calculation means of a distance measurement signal upon detection thereof.

* * * * *